Figure 6:
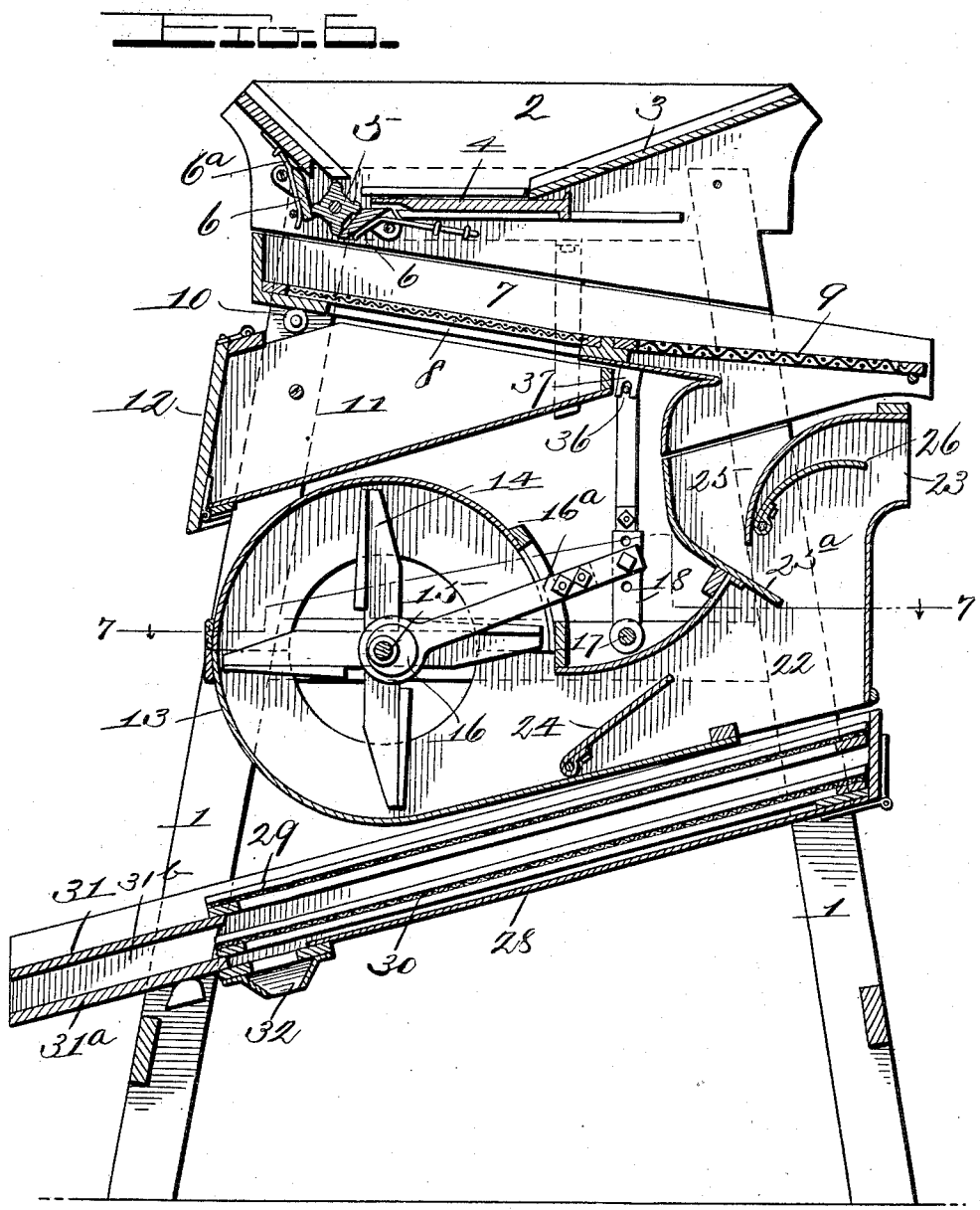

O. C. HATFIELD.
SEED AND GRAIN CLEANER.
APPLICATION FILED AUG. 10, 1915.
1,205,739.
Patented Nov. 21, 1916.
4 SHEETS—SHEET 1.
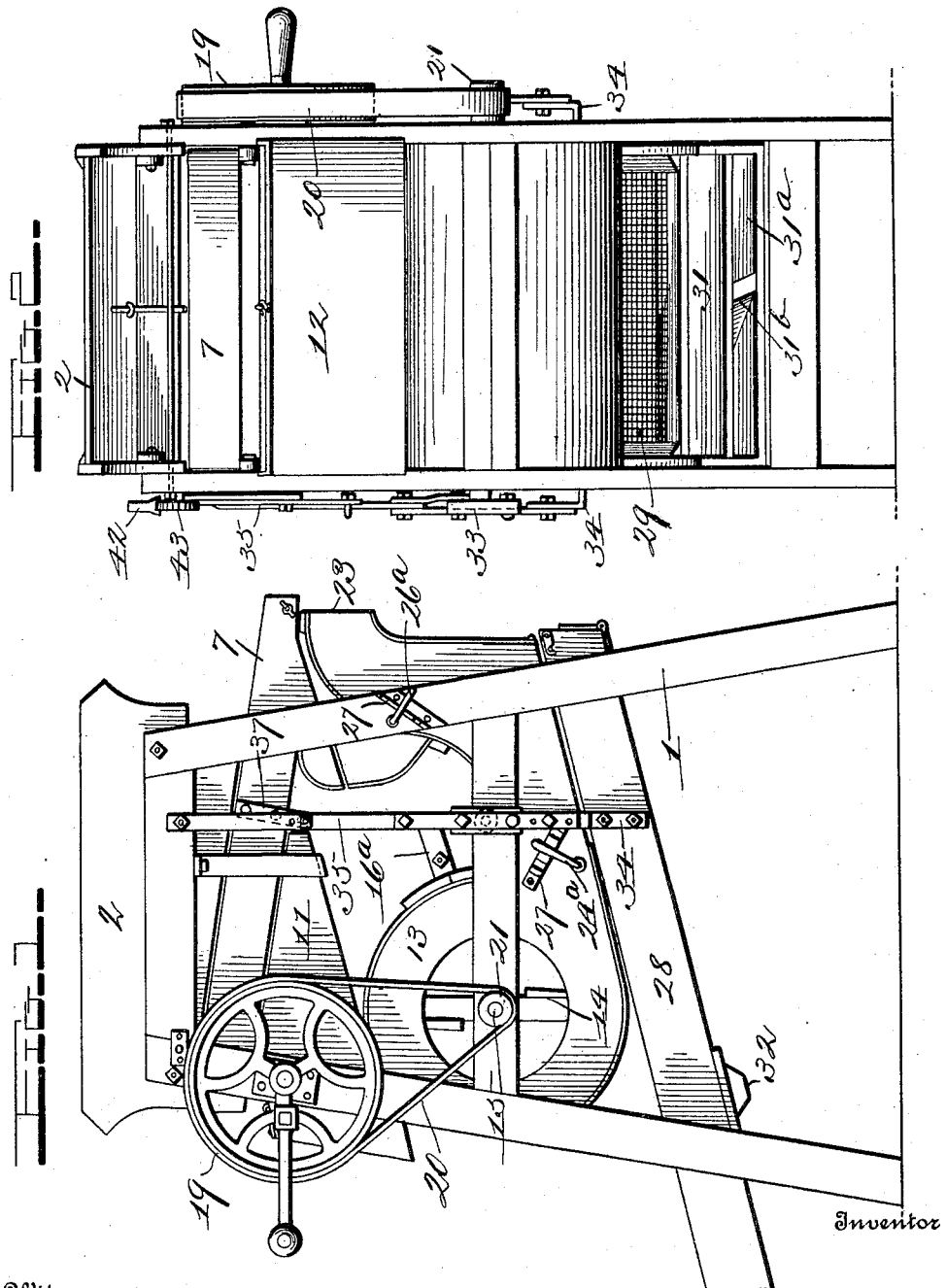
Witness
Chas. L. Grieshauer.
Inventor
Orland C. Hatfield,
By E. B. McBath
Attorney

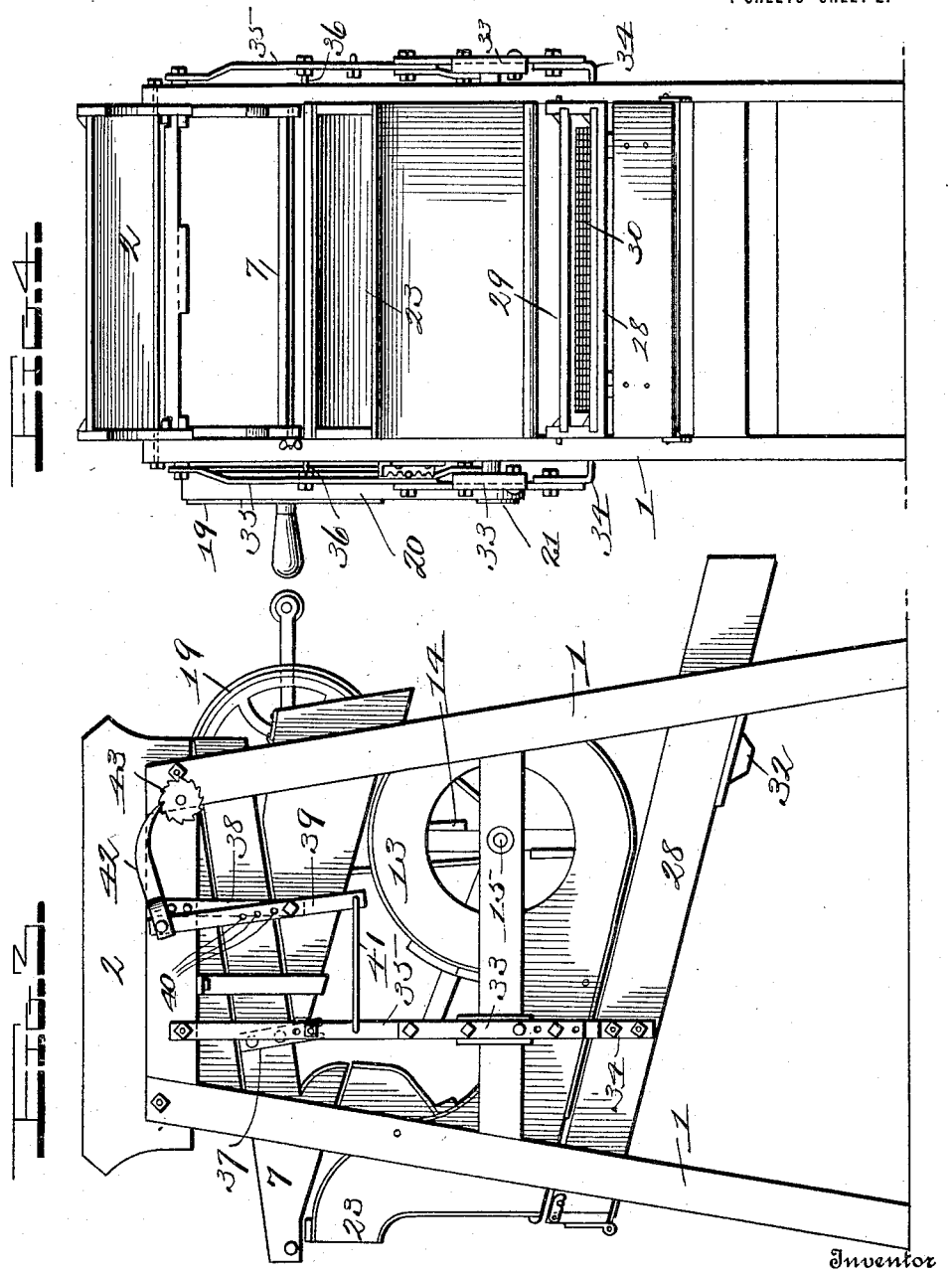

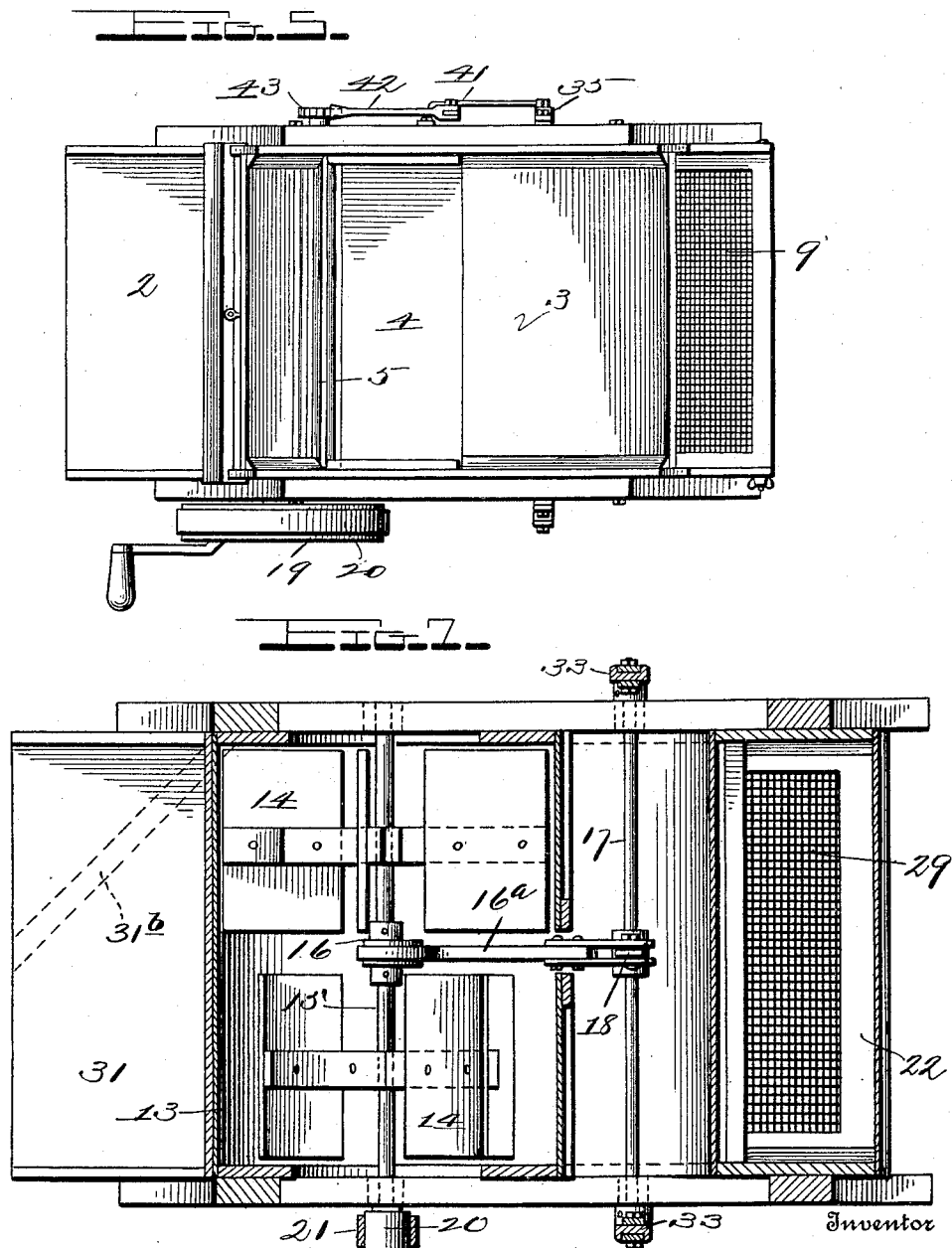

O. C. HATFIELD.
SEED AND GRAIN CLEANER.
APPLICATION FILED AUG. 10, 1915.

1,205,739.

Patented Nov. 21, 1916.
4 SHEETS—SHEET 4.

Inventor
Orland C. Hatfield,

Witness
Chas. L. Grieebauer.

By E. B. McBath
Attorney.

UNITED STATES PATENT OFFICE.

ORLAND C. HATFIELD, OF RICHMOND, INDIANA.

SEED AND GRAIN CLEANER.

1,205,739.  Specification of Letters Patent.  Patented Nov. 21, 1916.

Application filed August 10, 1915. Serial No. 44,705.

*To all whom it may concern:*

Be it known that I, ORLAND C. HATFIELD, a citizen of the United States, residing at Richmond, in the county of Wayne and State of Indiana, have invented certain new and useful Improvements in Seed and Grain Cleaners, of which the following is a specification.

This invention relates to a grain and seed cleaning machine, being designed to clean grains and seeds of various kinds and sizes.

The main object of the invention is to provide an easily operated machine in which the various kinds of grains and seeds may be cleaned without requiring the carrying of a large number of extra parts, and in which the feed of the grain or seeds and the direction and strength of the air current can be adjusted to suit the grain or seed passing through the machine.

The further object of the invention is to provide a device of this kind in which the various parts are so arranged and combined that the machine will be simple in construction, and entirely free from any unnecessary parts or complicated forms of gearing. By so doing the weight of the machine is greatly decreased, its cost of construction is lessened, and it is made easier of operation, the movable parts being reduced to minimum.

The invention also consists in the novel features of construction hereinafter described, pointed out in the claim and shown in the accompanying drawings, in which:

Figure 1 is a side elevation. Fig. 2 is a front elevation. Fig. 3 is a side elevation, looking in the opposite direction from Fig. 1. Fig. 4 is a rear elevation. Fig. 5 is a plan view. Fig. 6 is an enlarged vertical section from front to rear. Fig. 7 is a section on the irregular line 7—7 of Fig. 6.

In these drawings 1 represents the supporting members forming a part of a suitable frame, upon the upper portion of which is mounted a hopper 2. For convenience of description I will refer to the discharge end of the device as the front, and the opposite or exhaust end as the rear, but it will be understood that these are merely relative terms employed for convenience of description.

The rear end of the hopper is provided with an inclined surface 3 down which the grain or seed may be fed, and the bottom of the hopper is partially closed by a suitable slide 4 which works in suitable guide-ways carried by the frame of the device. At the front of the hopper and in substantially the same plane as the slide 4 is a feed roller 5, longitudinally ribbed, and closure plates 6 are hinged adjacent opposite sides of said roller and suitable springs 6ª hold said plates against the roller or the pins thereon, and prevent discharge of grain or seed from the hopper when said roller is stationary, it being understood that the slide 4 is pushed forward so as to overhang the rearmost plate 6. Below said hopper and the parts above described is hung a chaff shoe 7. This shoe carries front and rear screens 8 and 9 respectively, the front screen being preferably of a finer mesh than the rear screen. These screens are removable and may be replaced by other forms than those shown if desired.

It will be noted that the screens are at a slight angle to each other the forward one having the greater degree inclination, and the forward end of the chaff shoe rests upon suitable rollers 10. Fitting below the screen 8 and receiving the small seeds passing therethrough is a box 11 having a front hinge door 12. Below said box is a fan casing 13 provided with two fans 14. These fans are fixed upon a shaft 15 and between the fans I secure to said shafts an eccentric 16, and the eccentric rod 16ª works through the rear side of the fan casing and is operatively connected to a rock shaft 17 by means of a short arm 18. This connection is made by a bolt and a number of bolt openings are produced in the arm 18 so as to allow for adjustment, said adjustment regulating the rocking of the shaft 17. Upon the right hand side of the machine I place a hand wheel 19 and a drive belt 20 runs over said wheel and over a pulley 21 fixed upon an outer end of the shaft 15. But it is of course obvious that any form of drive power may be employed as it is not necessary that the machine be driven by hand.

Running from the rear of the fan casing is an air chamber 22 which extends rearwardly and upwardly the full width of the machine and opens at the rear by a contracted mouth 23. An air board 24 is arranged in the lower forward portion of the air chamber 22, and may be adjusted to regulate a current of air therethrough. Beneath the screens 9 is a grain chute 25 which communicates with the main body portion of the air chamber 22, and the main wall of said chute projects into said air chamber and forms a deflector 25ª, throwing the grain straw and chaff toward the rear end of the air chamber and also deflecting the air current. Between the deflector 25ª and the mouth 23 of the air chamber is hinged a transversely curved air board 26 which may be adjusted so as to throw all of the air out of said mouth 23, or it can be closed and the air current directed upwardly through the chute 25 and the screen 9, or it may occupy an intermediate position as shown in Fig. 6. By adjustment of this air board and regulation of the air current by the board 24 combined with the arrangement of the deflector 25ª the passage of material from the shoe 25 is retarded thereby permitting thorough separation by the air current between chaff and straw or other light waste material and the heavier grains which will pass to a lower shoe 28. The air boards 24 and 26 are adjusted by means of small levers 24ª and 26ª, respectively which are arranged upon the out side of the frame and work over suitable rack bars 27.

The shoe 28 carries upper and lower screens 29 and 30 which further separate the heavier grains, the screen 29 discharging upon a front inclined discharged board 31 and the screen 30 discharging upon a lower board 31ª, while anything which passes through the lower screen 30 is discharged from the shoe 28 through a suitable discharge opening 32. The remainder of the mechanism is designed to rock the chaff shoes 7 and 28 and to impart a rocking motion to the closure board 6 by rotation of the ribbed roller 5.

To the ends of the rock shaft 17 are secured arms 33 the lower portions of which are pivotally connected to brackets 34 secured to the sides of the shoe 28, and the upper ends of said arms are pivotally connected to the lower ends of links 35 pivotally hung from the upper portion of the frame. A rod 36 connects the links 35 and straps 37 depend from the sides of the shoe 7 and the ends of said straps are notched to fit over the rod 36, as shown most clearly in Fig. 6. By means of this construction a longitudinal rocking motion will be given to both shoes. On the side of the device opposite the hand wheel 9 is secured a depending bracket 38 and a lever 39 is pivotally connected to said bracket by suitable bolt, the lever having a number of bolt openings 40 so that its point of connection to the bracket 38 can be shifted. The lower end of the lever 39 is connected by a rod 41 with the adjacent link 35, and the upper end of the lever carries a pawl 42 which engages a ratchet wheel 43 mounted on the outer end of the roller 5. By this means a step by step movement or an intermittent movement is given to said roller, and the rate of feed can be regulated by adjustment of the lever 39 on the bracket 38.

With a device of this kind constructed as shown and described seeds and grains of all kinds can be readily separated and cleaned.

Between the partition 31 and the board 31ª is an obliquely arranged wall 31ᵇ which contracts the discharge mouth from the screen 30.

What I claim is:

A device of the kind described comprising two oppositely arranged shoes, the upper shoe being provided with two longitudinally alining screens at an obtuse angle with each other, a seed box under the forward of said screens, and the lower shoe being provided with superimposed screens, a fan casing between the shoes, an upwardly and rearwardly extending air chamber communicating directly with the rear end of the lower shoe and receiving grain from the upper shoe, a grain chute leading from the upper shoe into said air chamber, a wall of said grain shoe projecting transversely into an air chamber and forming a deflector, an air board arranged between the fan casing and said deflector, and a second air board hinged in the upper portion of the air chamber and between its outlet and the point of entrance of the grain shoe.

In testimony whereof I affix my signature in the presence of two witnesses.

ORLAND C. HATFIELD.

Witnesses:
R. F. LAYMON,
RICHARD D. POWELLS.

Copies of this patent may be obtained for five cents each, by addressing the "Commissioner of Patents, Washington, D. C."